United States Patent
Haimer et al.

(10) Patent No.: US 9,694,429 B2
(45) Date of Patent: Jul. 4, 2017

(54) BALANCING OR MEASURING ADAPTER

(71) Applicant: HAIMER GmbH, Igenhausen (DE)

(72) Inventors: Franz Haimer, Igenhausen (DE); Wolfgang Kügle, Aichach (DE)

(73) Assignee: Haimer GmbH, Igenhausen (DE)

( * ) Notice: Subject to any disclaimer, the term of this patent is extended or adjusted under 35 U.S.C. 154(b) by 256 days.

(21) Appl. No.: 14/419,141

(22) PCT Filed: Aug. 2, 2013

(86) PCT No.: PCT/EP2013/066244
§ 371 (c)(1),
(2) Date: Apr. 14, 2015

(87) PCT Pub. No.: WO2014/020135
PCT Pub. Date: Feb. 6, 2014

(65) Prior Publication Data
US 2015/0290720 A1   Oct. 15, 2015

(30) Foreign Application Priority Data

Aug. 2, 2012   (DE) .................. 10 2012 107 099

(51) Int. Cl.
*G01M 1/04* (2006.01)
*B23B 31/26* (2006.01)
*B23B 29/04* (2006.01)

(52) U.S. Cl.
CPC .......... *B23B 31/265* (2013.01); *B23B 29/046* (2013.01); *G01M 1/04* (2013.01)

(58) Field of Classification Search
CPC ............................... G01M 1/04; B23B 31/265
(Continued)

(56) References Cited

U.S. PATENT DOCUMENTS

| 6,481,940 B2 | 11/2002 | Prust et al. |
| 6,612,791 B1 | 9/2003 | Haimer |
| 2002/0014141 A1 | 2/2002 | Prust et al. |

FOREIGN PATENT DOCUMENTS

| DE | 4303608 | 8/1994 |
| DE | 29980181 | 9/2001 |

(Continued)

OTHER PUBLICATIONS

Translation of JP 2001-110690, generated on Dec. 12, 2016.*
(Continued)

*Primary Examiner* — John Chapman, Jr.
(74) *Attorney, Agent, or Firm* — Paul D. Bianco; Stephen Bongini; Fleit Gibbons Gutman Bongini & Bianco PL

(57) ABSTRACT

The invention relates to a balancing or measuring adapter (1) for clamping a component (2) on a rotating machine element of a balancing or measuring machine, which has a main body (4, 5) with a receiving opening (6) for the component (2) to be clamped, a collet chuck (11) arranged inside the main body (4, 5) with clamping tongues (26) for centrally clamping the component (2) and an actuator (12) axially adjustable between a clamp position and a release position for actuating the collet chuck (11). The collet chuck (11) is arranged inside the main body (4, 5) so as to be axially moveable such that, upon a displacement of the actuator (12) from the release position into the clamp position, in a first clamping phase the clamping tongues (26) of the collet chuck (11) move radially outwards, firstly to a front chucking area (27) allocated to the component (2) to be clamped, and that in a second clamping phase, the clamping tongues (26) move radially outwards with an axial movement inside the main body (4, 5) to a rear chucking area (28) allocated to the main body (4, 5).

20 Claims, 4 Drawing Sheets

(58) Field of Classification Search
USPC .......................................................... 73/487
See application file for complete search history.

(56) References Cited

FOREIGN PATENT DOCUMENTS

| | | |
|---|---|---|
| DE | 10031027 | 1/2002 |
| EP | 1166932 | 1/2002 |
| EP | 1201340 | 5/2002 |
| JP | 2011110690 | 6/2011 |

OTHER PUBLICATIONS

English translation of International Search Report dated Nov. 22, 2013 for PCT/EP2013/066244.
English translation of Written Opinion dated Feb. 2, 2015 for PCT/EP2013/066244.
English translation of International Preliminary Report on Patentability dated Feb. 3, 2015 for PCT/EP2013/066244.
International Search Report for PCT/EP2013/066244 dated Nov. 22, 2013.
Result of search report for DE 20 1012 107 099.7 dated Aug. 2, 2012.

* cited by examiner

BALANCING OR MEASURING ADAPTER

FIELD OF THE INVENTION

The invention relates to a balancing or measuring adapter and to a balancing or measuring machine having such a balancing or measuring adapter.

BACKGROUND OF THE INVENTION

Such balancing or measuring adapters are used for clamping a rotating component onto a balancing or measuring machine. A balancing machine having a balancing adapter of the type in question is known from DE 299 80 181. It contains a main body having a centered receiving opening for the component to be clamped and a claw actuating unit, movable relative to the main body, for a collet chuck. In this known design, the collet chuck is fixedly mounted on the main body and is not movable axially relative thereto. The clamping tongues of the collet chuck are therefore moved only radially when the claw actuating unit is displaced axially, and therefore the axial retraction travel is limited.

SUMMARY OF THE INVENTION

Some embodiments of the invention address the issue of creating a balancing or measuring adapter that enables a precisely positioned and reproducible reception and holding of a component to be clamped, with an enlarged retraction travel.

Expedient improvements and advantageous embodiments of the invention are also disclosed.

In the balancing or measuring adapter according to the invention, the collet chuck is arranged so as to be movable axially inside the main body such that, during a displacement of the actuating element from the release position into the clamping position, the clamping tongues of the collet chuck first move radially outward, during a first clamping phase, on a front clamping region associated with the component to be clamped, and during a second clamping phase, the clamping tongues move with an axial movement inside the main body and radially outward on a second clamping region associated with the main body. Thereby the clamping tongues of the collet chuck can first pivot at their outer, free ends and engage with a corresponding clamping groove on the inner side of a depression of the component to be clamped, while the rear clamping regions of the clamping tongues do not undergo a radial movement. Only during a further displacement of the actuating element into the clamping position do the clamping tongues also undergo an axial movement inside the main body and are also pressed radially outward on a rear clamping region. An enlarged axial retraction travel inside the main body [can] be achieved via this additional axial movement.

The actuating element expediently has a first outer conical surface associated with the front clamping region of the clamping tongues, and at least one second conical surface associated with the rear clamping region of the clamping tongues, the second conical surface being arranged offset axially relative to the first conical surface such that the first conical surface initially engages with the clamping tongues of the collet chuck during a displacement of the actuating element into the clamping position, and later the second conical surface engages with the clamping tongue of the collet chuck.

In an advantageous embodiment, the clamping tongues have a first inner clamping surface and a second inner clamping surface for contact with the first conical surface and the second conical surface, respectively, of the actuating element. The actuating element can additionally have a third conical surface adjoining the second conical surface, for contact with a third inner clamping surface of the clamping tongues, the third conical surface of the actuating element and the third conical surfaces of the clamping tongues having a lower inclination relative to the central axis of the main body than the second conical surface of the actuating element and the second conical surfaces of the clamping tongues. This has the effect that the clamping tongues initially have a large clamping travel with lesser clamping force and then have a smaller clamping travel with greater clamping force. A conical contact surface for contact with a conical inner clamping surface of the main body is preferably provided on the outer side of the rear clamping region of the clamping tongues.

In a favorable embodiment, the clamping tongues are formed integrally with a sleeve-like socket. The integral formation reduces the number of parts that are movable relative to one another and thereby a uniform mass distribution during the clamping process can be achieved. Rear slots, which are aligned with front axial slots between the clamping tongues and are open toward the front slots and closed to the rear, can be arranged in the socket. Thereby the elasticity of the collet chuck itself can be used for the radial return movement. No separate return elements are necessary. The rear slots are preferably wider than the front slots. Thereby the clamping tongues are very flexible and pliable in the rear region.

The collet chuck can be inserted into a recess in the main body and is supported at its lower end on a pressure disk impinged upon by compression springs. The collet chuck can be secured against inadvertently dropping out by radial pins in the main body.

The clamping tongues are designed to be relatively elongated in the front region, in order to be able to compensate for irregularities such as concentricity errors on the clamping surfaces. Thereby an axial elasticity can be achieved. In particular, the length of the front region of the collet chuck is greater than the diameter of the collet chuck.

In order to reduce the friction during the axial movement of the collet chuck inside the main body, the collet chuck can be arranged so as to be axially movable in the main body, for example by a bearing ring furnished with rolling elements. The rolling elements can be radially prestressed, so that play-free guidance results.

The invention further relates to a balancing or measuring machine containing a balancing or measuring adapter having the above-described features.

BRIEF DESCRIPTION OF THE DRAWINGS

Additional details and advantages of the invention emerge from the following description of a preferred embodiment with reference to the drawing. In the drawing.

DETAILED DESCRIPTION OF THE INVENTION

Figure 1:
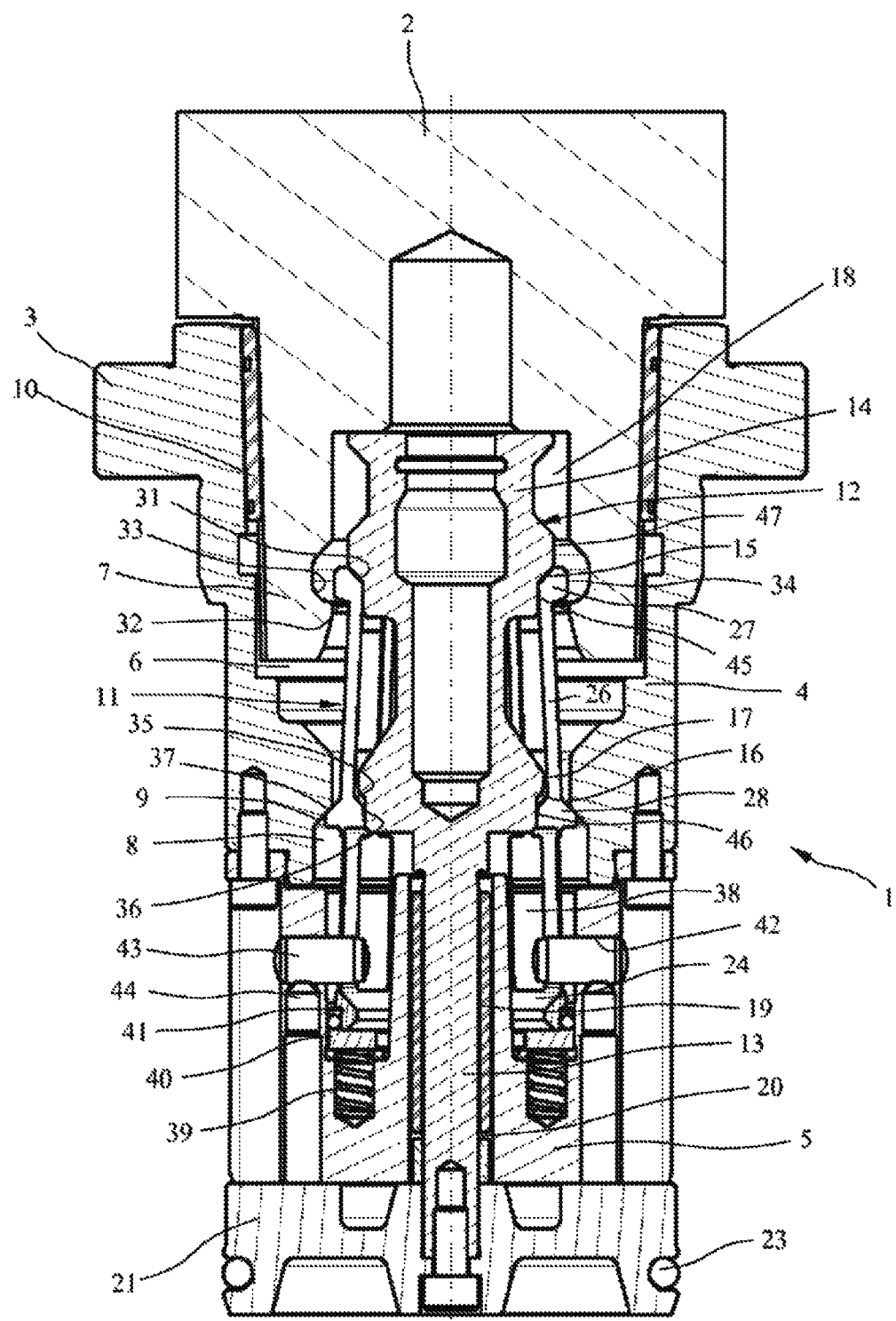
FIG. 1: shows a longitudinal section of a balancing or measuring adapter in a release position.
Figure 2:
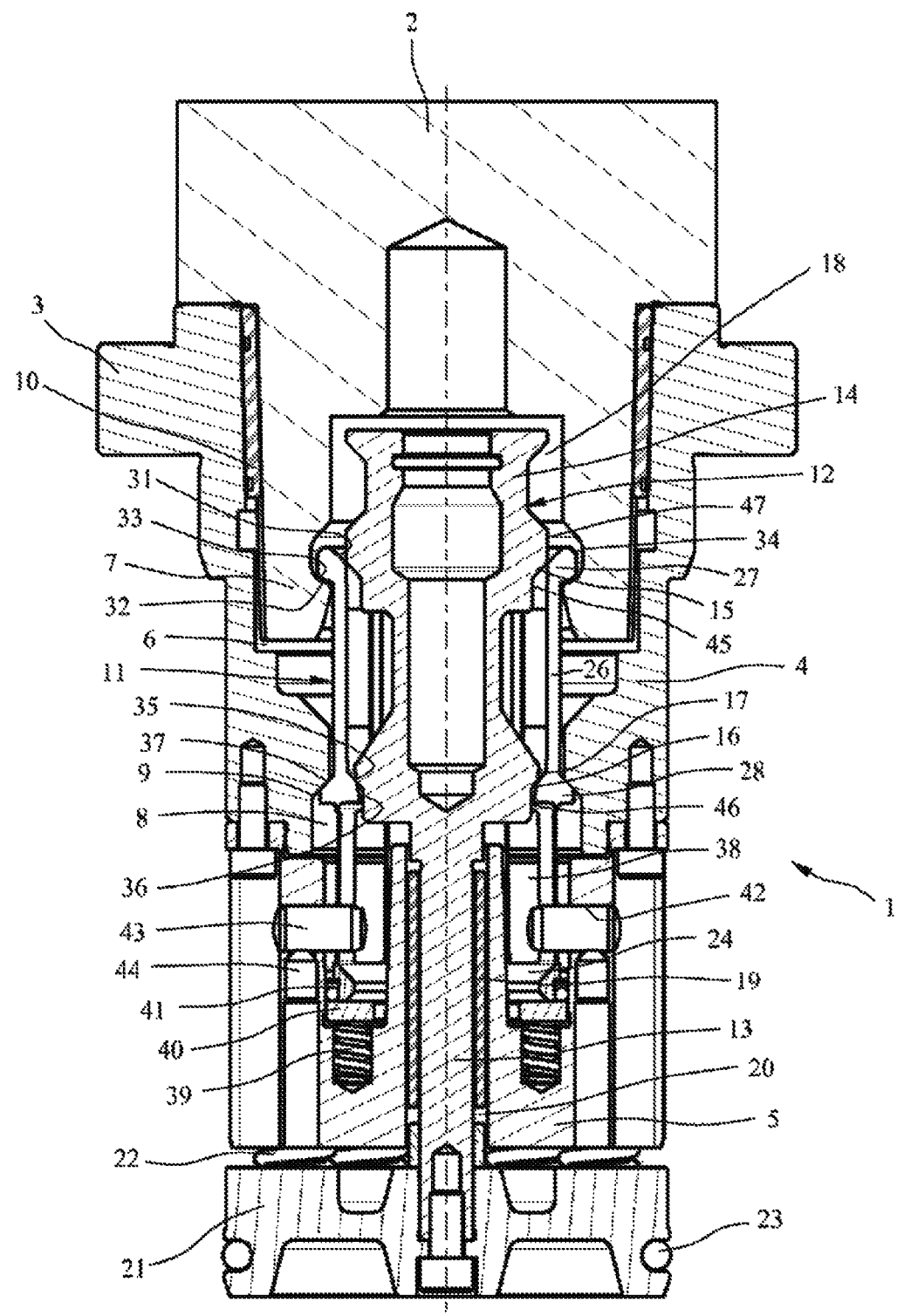
FIG. 2: shows a longitudinal section of a balancing or measuring adapter from FIG. 1 in an intermediate position.
Figure 3:
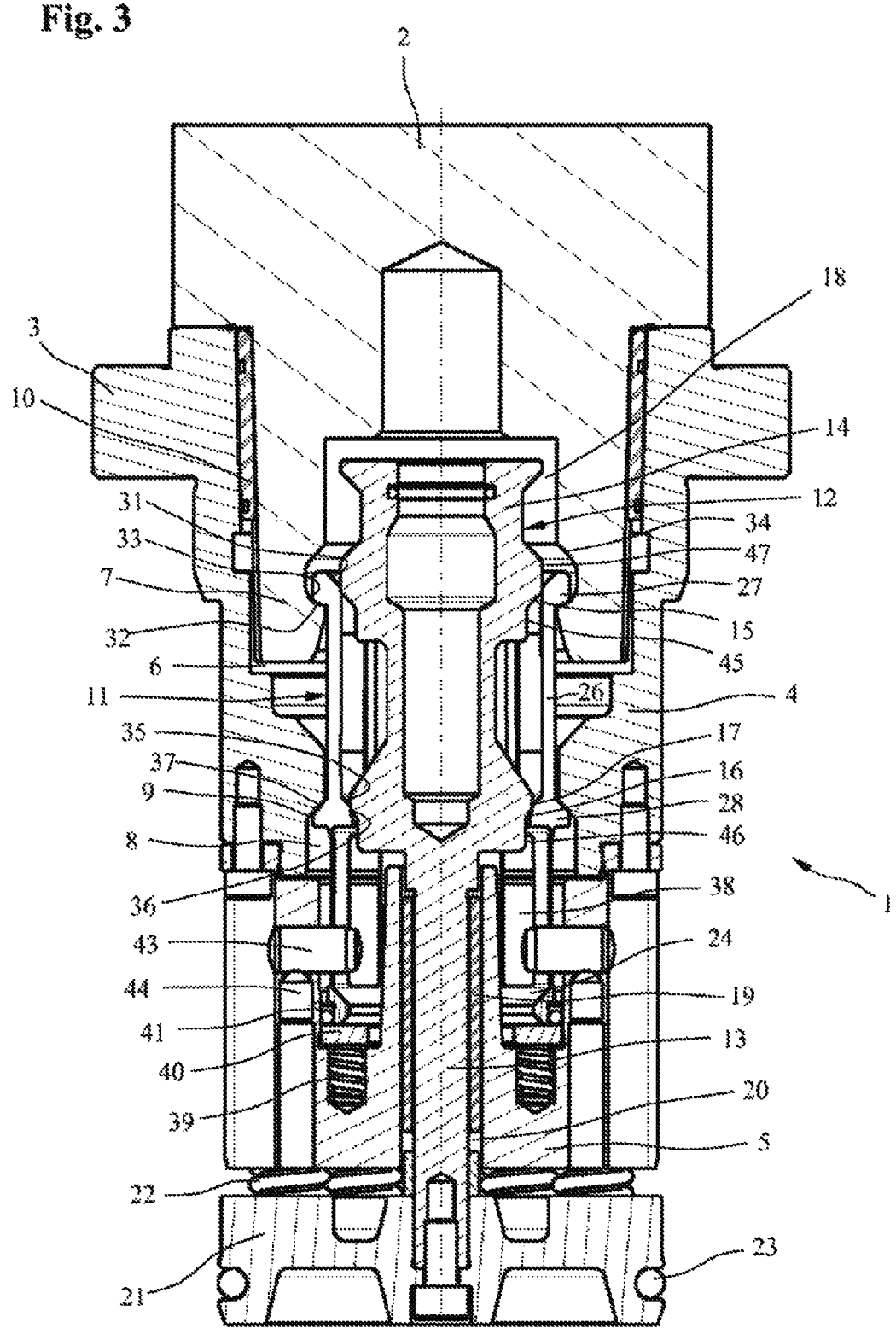
FIG. 3: shows a longitudinal section of a balancing or measuring adapter from FIG. 1 in a clamping position.

The balancing or measuring adapter 1 shown in different clamping positions in FIGS. 1-3 is conceived for clamping a rotating component 2 on a balancing or measuring machine. Centered, highly precise and repeatable holding of the component 2 to be balanced or measured is of particular importance in such machines. The balancing or measuring adapter 1 contains a main body, which can be inserted into the drive spindle of the balancing or measuring machine for example, and which consists in the illustrated embodiment of a hollow cylindrical upper part 4 furnished with a flange 3 and a lower part 5 screwed onto the upper part. The main body can be mounted on the upper side of the drive spindle by means of the flange 3, for example.

The upper part 4 has an upper receiving opening 6 for a shaft 7 of the component 2 to be clamped and a lower passage region 8 with conical inner clamping surfaces 9. The component 2 can be a tool holder for a drilling, milling or grinding tool, a rotor or some other machine part to be balanced or measured. The shaft 7 is shaped conically and can have a polygonal, circular or other suitable cross section. The receiving opening 6 of the upper part 4 is correspondingly conical and has an inner contour matched to the cross section of the shaft 7. A bearing bushing 10 with multiple rolling elements arranged in a cage can be inserted into the receiving opening 6 of the upper part 4. Thereby the introduction of the shaft 7 into the upper part 4 of the main body can be facilitated. A collet chuck 11 and an actuating element 12 coaxial with the collet chuck are arranged in the main body, composed of the upper part 4 and the lower part 5, in order to actuate the collet chuck 11.

The actuating element 12 contains a lower rod-like guidance region 13 and an upper actuating head 14 with a first outer conical surface 15 in the upper part and two adjoining second and third outer conical surfaces 16 and 17 having different inclinations in the lower part. The actuating head 14 of the actuating element 12 engages at its upper part with a recess 18 in the shaft 7 of the component 2 to be clamped. In the embodiment shown, the first and second conical surfaces 15 and 16 have an inclination of 45° and the third conical surface 17 has an inclination of 4° relative to the center axis of the main body. The actuating element 12 is guided movably in the lower part 5 of the main body by the rod-like guidance region 13 by means of a bearing sleeve 19 provided with rolling elements. The bearing sleeve 19 is inserted into the central passage hole 20 in the lower part 5. The rolling elements can be radially prestressed so that play-free guidance results. A piston 21 is mounted at the end of the rod-shaped guidance region 13 pointing downward relative to the lower part 5.

Compression springs 22 that are visible in FIGS. 2 and 3 are tensioned between the piston 21 and the lower part 5. For stable retention, the compression springs 22 are inserted into blind holes, not visible, in the lower part 5 and in the piston 21. The actuating element 12 is pressed by these compression springs 22 into the clamping position shown in FIG. 3. By displacing the piston 21 against the force of the compression springs 22, the actuating element 12 can be pushed via an intermediate position shown in FIG. 2 into the release position shown in FIG. 1. For this purpose, the piston 21 can be movably arranged, sealed via a radial seal 23, in the drive spindle of the balancing or measuring machine and can be impinged upon from the lower side with compressed air.

Figure 4:
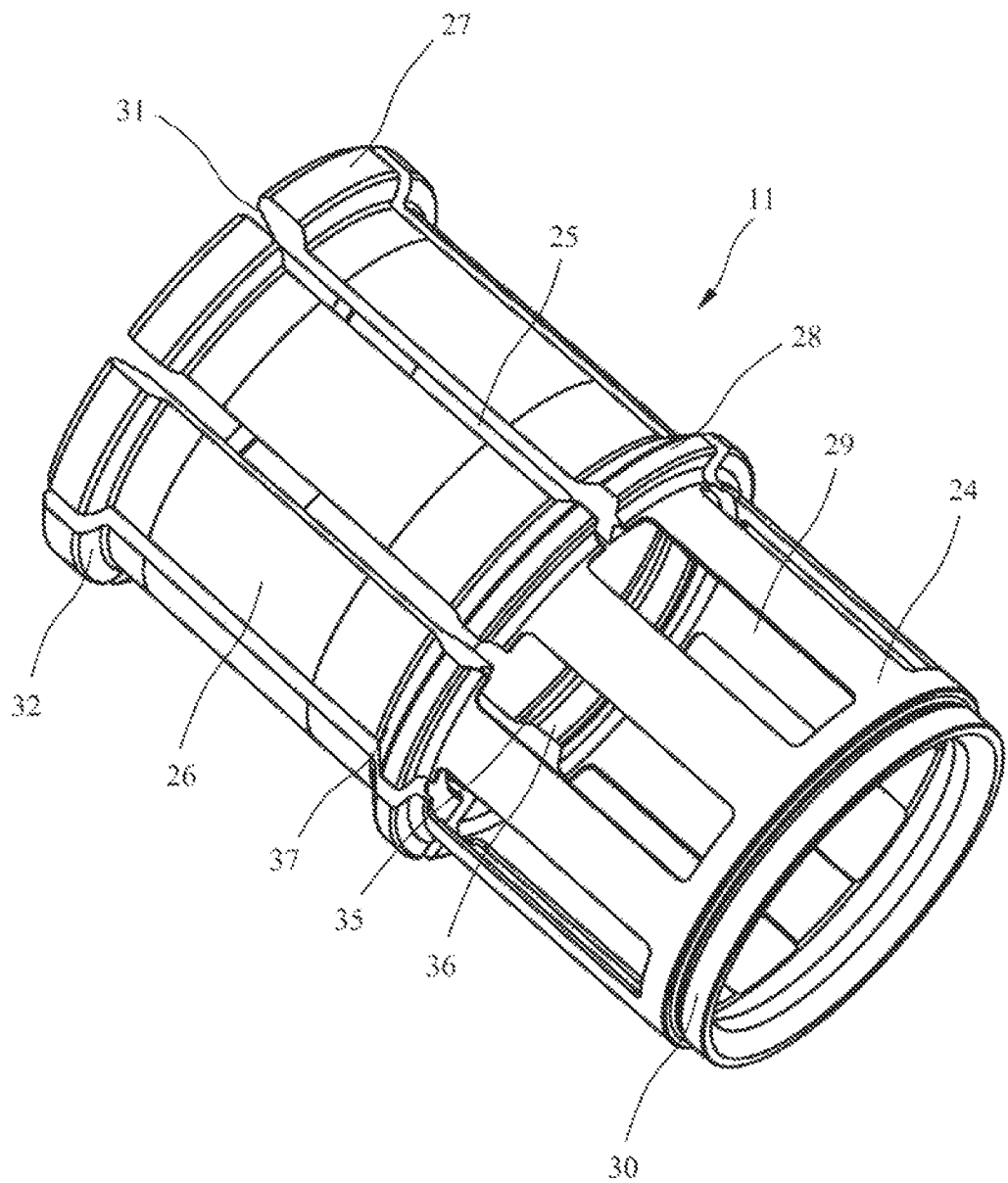
FIG. 4: shows a collet chuck in a perspective view.

The collet chuck 11, shown separately in FIG. 4, has a sleeve-like socket 24 and a plurality of radially resilient clamping tongues 26 separated from one another by axial slots 25 and having a front clamping region 27 associated with the component 2 to be clamped and a rear clamping region 28 associated with the main body. The two clamping regions 27 and 28 are designed as thickened parts of the clamping tongues 26. Rear slots 29, which are open toward the front slots 25 and closed toward the rear end of the socket 24, are arranged in the sleeve-like socket 24 of the collet chuck 11 and are also aligned with the front slots 25. The rear slots 29, transitioning into the front slots 25, have a larger width than the front slots 25. An external annular groove 30 is introduced into the rear end of the socket 23.

The front clamping regions 27 facing the component 2 to be clamped have first inner conical clamping surfaces 31 for contact with the first outer conical surface 15 on the actuating head 14 of the actuating element 12. First outer clamping surfaces 32 for contact with an inner clamping surface 33 of a clamping groove 34 arranged on the inner side of the recess 18 are also provided on the front clamping regions 27. Successive conical second and third clamping surfaces 35 and 36 for contact with the second and third conical surfaces 16 and 17 of the actuating element 12 are located on the inner side of the rear clamping regions 28. Corresponding to the second and third conical surfaces 16 and 17, the second and third conical clamping surfaces 35 and 36 are inclined differently and have an angle of 45° and 4°, respectively, relative to the central axis in the illustrated embodiment. A conical contact surface 37 for contacting the conical inner clamping surface 9 on the inner side of the upper part 4 is provided on the outer side of the rear clamping regions 28.

The collet chuck 11 is inserted via the annular socket 24 into a corresponding recess 38 of the lower part 5 and rests at its lower end on a pressure disc 40 pushed upward by compression springs 39. A bearing ring 41 having a plurality of rolling elements arranged inside a cage for guiding the collet chuck 11 inside the recess 38 is arranged in the annular groove 30 at the lower end of the collet chuck 11. These rolling elements can also be radially prestressed so that play-free guidance results. Inwardly protruding radial pins 43 for engagement with the lower slots 29 of the collet chuck 11 are inserted into radial bores 42 in the lower part 5. Thereby the collet chuck 11 is axially secured inside the main body and the collet chuck 11 can be prevented from inadvertently falling out. The radially arranged pins 43 can be secured by axial threaded studs 44.

The operation of the above-described balancing or measuring adapter will be explained below with reference to FIGS. 1-3.

The balancing adapter 1 is shown in a release position in FIG. 1. The actuating element 12 is pressed upward by means of the piston 21 impinged upon by compressed air or some other pressure medium. In the illustrated release position, the thickened portions 27 of the resilient clamping tongues 26 of the collet chuck 11 contact a first cylindrical region 45 of the actuating head 14 underneath the first conical surface 15, and contact a second cylindrical surface 46 underneath the second conical surface 16 in the region of the rear thickened portion 28. In the first cylindrical region 45, the actuating head 14 has a smaller diameter than in a third cylindrical region 47 above the first conical surface 15. Thereby the front clamping regions 27 of the collet chuck 11 are tilted radially inward out of the clamping groove 34 and release the component 2 for removal from or insertion into the balancing adapter 1.

If the force acting from below on the piston 21 decreases, the actuating element 12 is pressed downward via the compression springs 22 tensioned between the lower part 5 and the piston 21. Thereby the front clamping regions 27 at the front, free ends of the resilient clamping tongues 26 of the collet chuck 11, which are engaged with the recess 18 of the component 2 to be clamped, slide on their inner conical clamping surfaces 31 along the first conical surface 15 of the actuating head 14, whereby the front ends of the resilient clamping tongues 26 are pressed radially outward into the clamping groove 34 on the inner side of the component 2. In a first clamping phase, only the front clamping regions 27 at the front, free ends of the resilient clamping tongues 26 are pressed radially outward until the second conical surface 16 of the actuating head 14 comes into contact with the conical clamping surfaces 35 of the collet chuck 11. As the axial displacement of the actuating element 12 increases, the rear clamping regions 28 are also pressed radially outward in a second clamping phase, and the collet chuck 11 carries out an axial movement against the force of the compression springs 39 due to the contact of the conical contact surface 37 with the conical inner clamping surface 9 of the upper part 4.

During movement of the rear clamping regions 28 along the 45°-angled conical surface 16, the clamping tongues 26 of the collet chuck 11 carry out a long clamping travel with a small clamping force. When the conical clamping surfaces 36 of the collet chuck 11 come into contact with the 4°-angled third conical surface 17 during further axial movement of the actuating element 12, a greater clamping force is then produced with a smaller clamping travel. The third conical surface 17 is arranged in the axial direction in such a manner that a movement of the rear clamping region 28 of the clamping tongues 26 along this surface and thus a clamping with greater force takes place only when the clamping tongues 26 are located with their front clamping region 27 in the cylindrical region 47 above the first conical surface 15 of the actuating element 12. In the second and third clamping phases, the collet chuck 11 is displaced axially inside the main body against the force of the compression springs 39.

By applying pressure to the piston 21, the release process can take place in the opposite manner, wherein the actuating head 14 comes into contact with the component 2 at its upper end face in the final phase of the release stroke and presses the component out of the receiving opening 18 of the main body. Thereby the component 2 can be simply removed.

The invention is not limited to the embodiment described above and illustrated in the drawings. Thus individual clamping phases can also overlap in part. In addition, the clamping system can be used analogously also for clamping processes in which the radial clamping movement progresses from the outside to the inside.

The invention claimed is:

1. Balancing or measuring adapter for clamping a component on a rotating machine element of a balancing or measuring machine, the adapter comprising:
   a main body having a receiving opening for the component to be clamped;
   a collet chuck arranged axially movably inside the main body and having clamping tongues for centered clamping of the component; and
   an actuating element movable between a clamping position and a release position for actuating the collet chuck,
   wherein the clamping tongues of the collet chuck have a front clamping region associated with the component to be clamped and a rear clamping region associated with the main body,
   the actuating element has a first outer conical surface, which is associated with the front clamping region of the clamping tongues, and at least one second outer conical surface, which is associated with the rear clamping region of the clamping tongues,
   a displacement of the actuating element from the release position into the clamping position includes a first clamping phase and a second clamping phase, and
   the second conical surface is arranged offset axially relative to the first conical surface such that, during a displacement of the actuating element from the release position into the clamping position, the first conical surface initially engages with the clamping tongues during the first clamping phase, and later the second conical surface engages with the clamping tongues during the second clamping phase.

2. Balancing or measuring adapter according to claim 1, wherein the clamping tongues have a first inner clamping surface and a second inner clamping surface for contact with the first conical surface and the second conical surface, respectively, of the actuating element.

3. Balancing or measuring adapter according to claim 1, wherein the actuating element contains a third conical surface adjoining the second conical surface, for contact with a third inner clamping surface of the clamping tongues.

4. Balancing or measuring adapter according to claim 3, wherein the third conical surfaces of the actuating element and the third clamping surfaces of the clamping tongues have a lesser inclination relative to the center axis of the main body than the second conical surfaces of the actuating element and the second clamping surfaces of the clamping tongues.

5. Balancing or measuring adapter according to claim 1, wherein, on the outer side of the rear clamping region, the clamping tongues have a conical contact surface for contact with a conical inner clamping surface of the main body.

6. Balancing or measuring adapter according to claim 1, wherein the clamping tongues of the collet chuck are arranged on a sleeve-like socket.

7. Balancing or measuring adapter according to claim 6, wherein the clamping tongues of the collet chuck are separated from one another by axial front slots, and wherein rear slots, which are aligned axially with the front slots and which are open toward the front slots and closed to the back, are arranged in the socket.

8. Balancing or measuring adapter according to claim 1, wherein the collet chuck is inserted into a recess of the main body and is impinged upon at its lower end by compression springs.

9. Balancing or measuring adapter according to claim 8, wherein a pressure disk is arranged between the lower end of the collet chuck and the compression springs.

10. Balancing or measuring adapter according to claim 1, wherein the collet chuck is secured against falling out in the axial direction by inwardly protruding radial pins arranged in the main body.

11. Balancing or measuring adapter according to claim 1, wherein the collet chuck is arranged so as to be movable axially via a bearing ring in the main body.

12. Balancing or measuring adapter according to claim 11, wherein the bearing ring has radially prestressed rolling elements.

13. Balancing or measuring adapter according to claim 1, wherein a bearing bushing is arranged in the receiving opening of the main body.

14. Balancing or measuring adapter according to claim 1, wherein the actuating element is mounted via a bearing bushing in the main body.

15. Balancing or measuring adapter according to claim 1, wherein the clamping tongues have a front region with a length greater than the diameter of the collet chuck.

16. Balancing or measuring machine comprising:
a rotating machine element; and
a balancing or measuring adapter according to claim 1.

17. Balancing or measuring adapter according to claim 1, wherein the second clamping phase occurs after the first clamping phase such that first and second clamping phases do not overlap.

18. Balancing or measuring adapter according to claim 1, wherein the first and second clamping phases partially overlap.

19. Balancing or measuring adapter for clamping a component on a rotating machine element of a balancing or measuring machine, the adapter comprising:
a main body having a receiving opening for the component to be clamped;
a collet chuck arranged axially movably inside the main body and having clamping tongues for centered clamping of the component; and
an actuating element movable between a clamping position and a release position for actuating the collet chuck,
wherein the clamping tongues of the collet chuck have a front clamping region associated with the component to be clamped and a rear clamping region associated with the main body,
the actuating element has a first outer conical surface, which is associated with the front clamping region of the clamping tongues, and at least one second outer conical surface, which is associated with the rear clamping region of the clamping tongues,
a displacement of the actuating element from the release position into the clamping position includes a first clamping phase and a second clamping phase, and
the second conical surface is arranged offset axially relative to the first conical surface such that, during a displacement of the actuating element from the release position into the clamping position, the front clamping region of the clamping tongues of the collet chuck first move radially outward during the first clamping phase, and later the rear clamping region of the clamping tongues of the collet chuck move radially outwards with an axial movement inside the main body during the second clamping phase.

20. Balancing or measuring adapter for clamping a component on a rotating machine element of a balancing or measuring machine, the adapter comprising:
a main body having a receiving opening for the component to be clamped;
a collet chuck arranged axially movably inside the main body and having clamping tongues for centered clamping of the component; and
an actuating element movable between a clamping position and a release position for actuating the collet chuck,
wherein the clamping tongues of the collet chuck have a front clamping region at free ends of the clamping tongues associated with the component to be clamped and a rear clamping region associated with the main body,
the actuating element has a first outer conical surface, which is associated with the front clamping region of the clamping tongues, and at least one second outer conical surface, which is associated with the rear clamping region of the clamping tongues,
a displacement of the actuating element from the release position into the clamping position includes a first clamping phase and a second clamping phase, and
the second conical surface is arranged offset axially relative to the first conical surface such that, during a displacement of the actuating element from the release position into the clamping position, only the front clamping regions of the clamping tongues of the collet chuck are pressed radially outward during the first clamping phase, and later during the second clamping phase the rear clamping regions of the clamping tongues of the collet chuck are pressed radially outward and the collet chuck carries out an axial movement due to contact of the rear clamping regions with a conical inner clamping surface of the main body.

* * * * *